(12) United States Patent
Jan et al.

(10) Patent No.: US 7,886,141 B2
(45) Date of Patent: Feb. 8, 2011

(54) METHOD AND SYSTEMS FOR ADVANCED REPROGRAMMABLE BOOT CODES AND IN-APPLICATION PROGRAMMING OF EMBEDDED MICROPROCESSOR SYSTEMS

(75) Inventors: Hsun-Yao Jan, Taoyuan (TW); Ting-Han Su, Hsinchu (TW)

(73) Assignee: Asix Electronics Corporation, Hsin Chu (TW)

( * ) Notice: Subject to any disclaimer, the term of this patent is extended or adjusted under 35 U.S.C. 154(b) by 648 days.

(21) Appl. No.: 11/925,839

(22) Filed: Oct. 27, 2007

(65) Prior Publication Data

US 2009/0113196 A1    Apr. 30, 2009

(51) Int. Cl.
*G06F 15/177* (2006.01)
(52) U.S. Cl. ................. 713/2; 713/1; 713/100
(58) Field of Classification Search ............. 713/1, 713/2, 100
See application file for complete search history.

(56) References Cited

U.S. PATENT DOCUMENTS

| | | | |
|---|---|---|---|
| 6,735,696 B1 * | 5/2004 | Hannah | 713/189 |
| 2007/0113067 A1 * | 5/2007 | Oh et al. | 713/2 |
| 2007/0239977 A1 * | 10/2007 | Wu | 713/2 |
| 2007/0283140 A1 * | 12/2007 | Jones et al. | 713/2 |

* cited by examiner

*Primary Examiner*—Abdelmoniem Elamin
(74) *Attorney, Agent, or Firm*—Ming Chow; Sinorica, LLC

(57) ABSTRACT

This invention relates to an advanced system and method of reprogrammable boot codes and In Application Programming (IAP) of embedded systems by booting up with boot loader to shadow program codes on to an internal high speed SRAM and extending contiguously to external higher space memory for runtime applications, and supporting on-line IAP to update run-time firmware or boot loader driver through network communication by utilizing advanced address remapping scheme as well as supporting In System Programming (ISP) to program initial Flash memory via ISP adaptor.

17 Claims, 7 Drawing Sheets

Boot Loader Memory Map

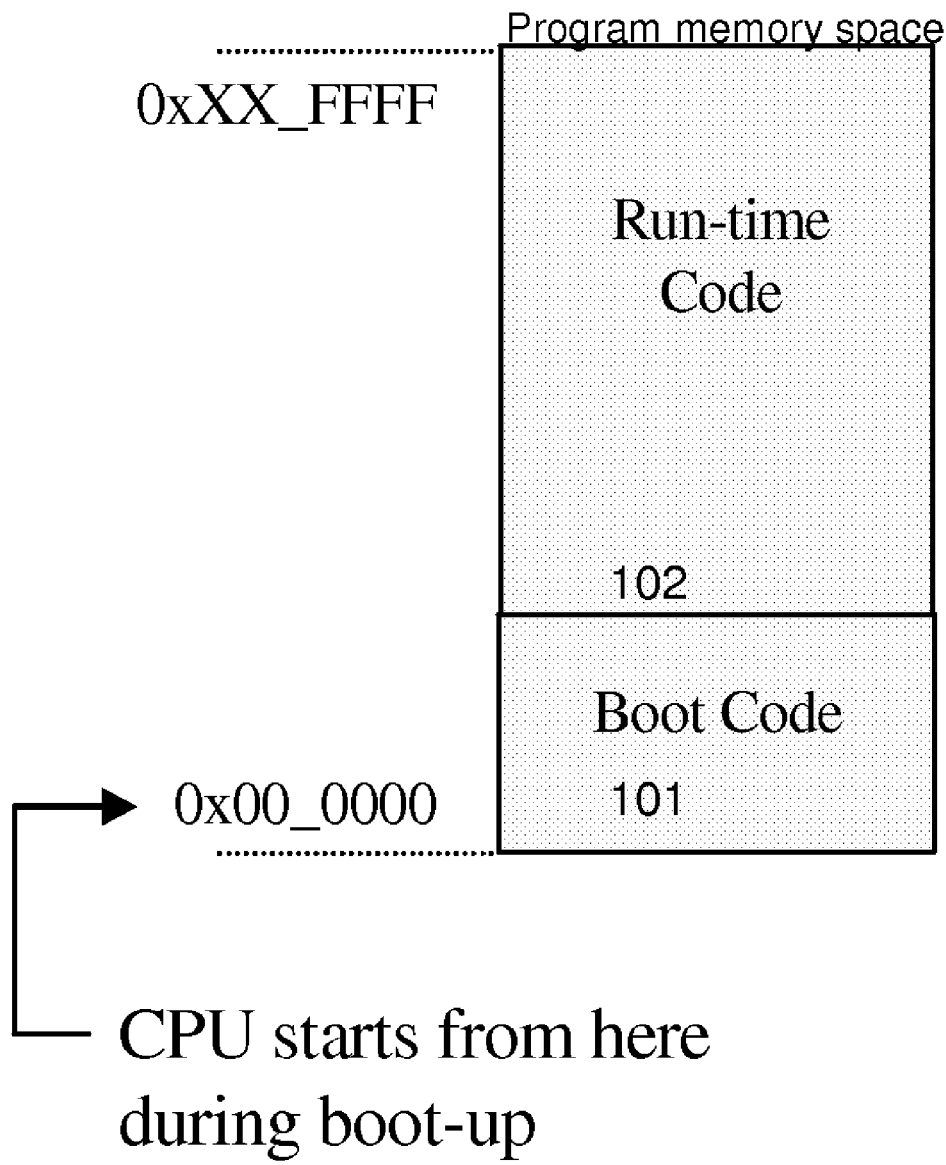
Figure 1: Boot Code Starting Address Space

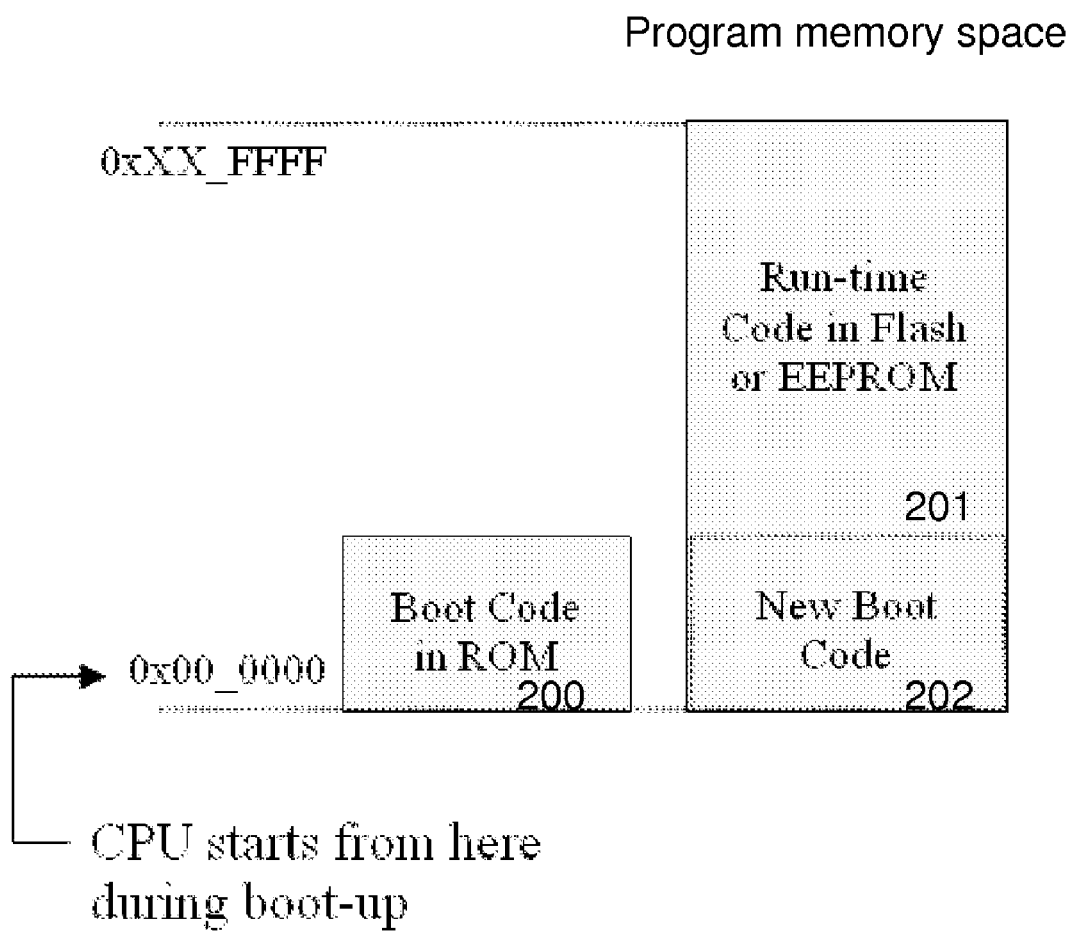
Figure 2: In-ROM Boot Code Starting Address Space

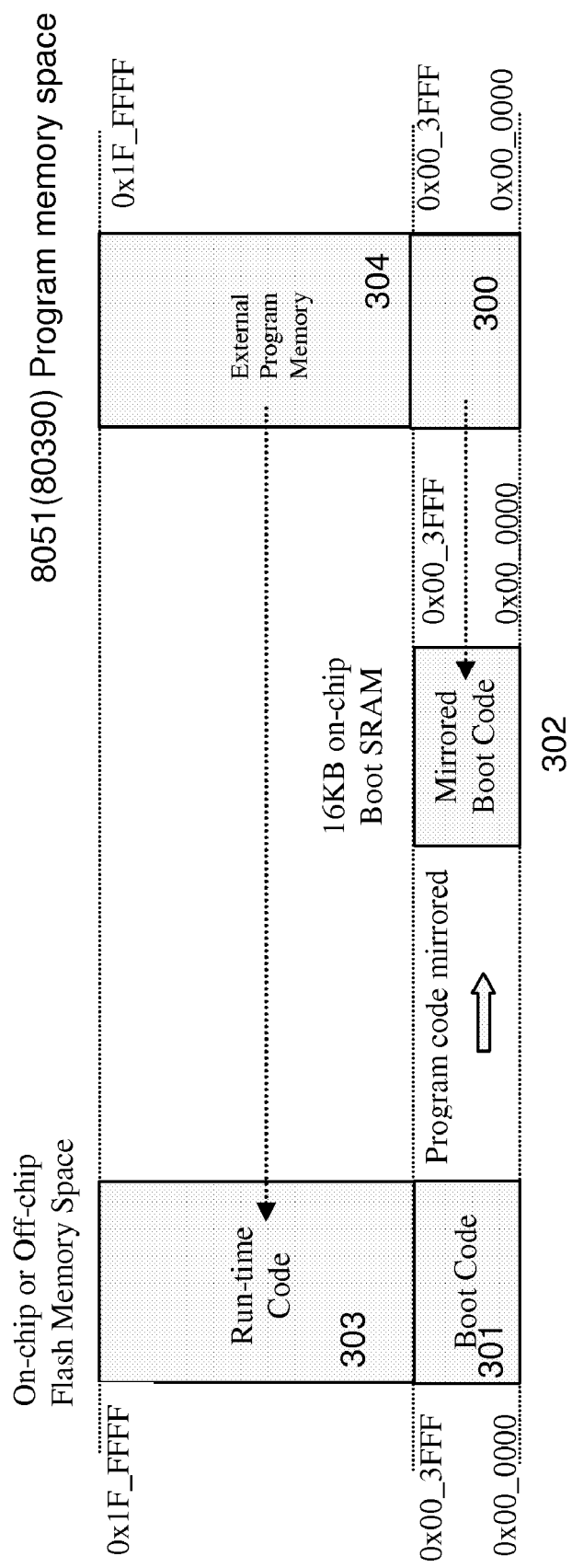
Figure 3: Boot Loader Memory Map

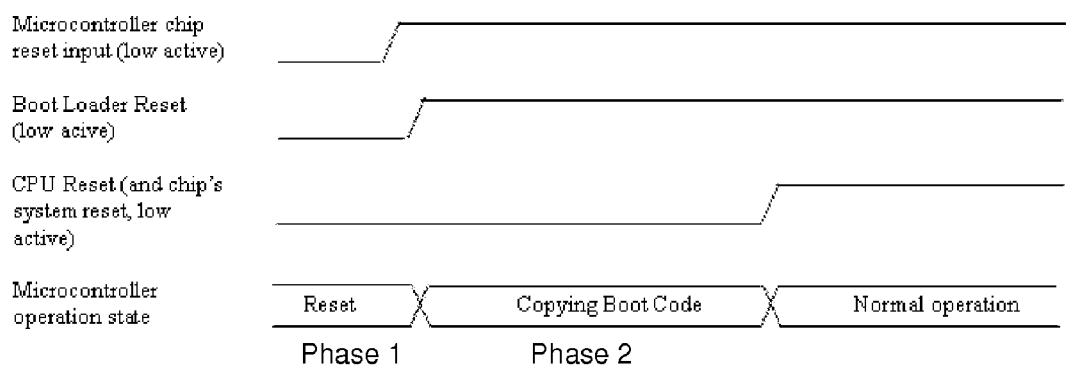
Figure 4: Boot Loader Timing Diagram

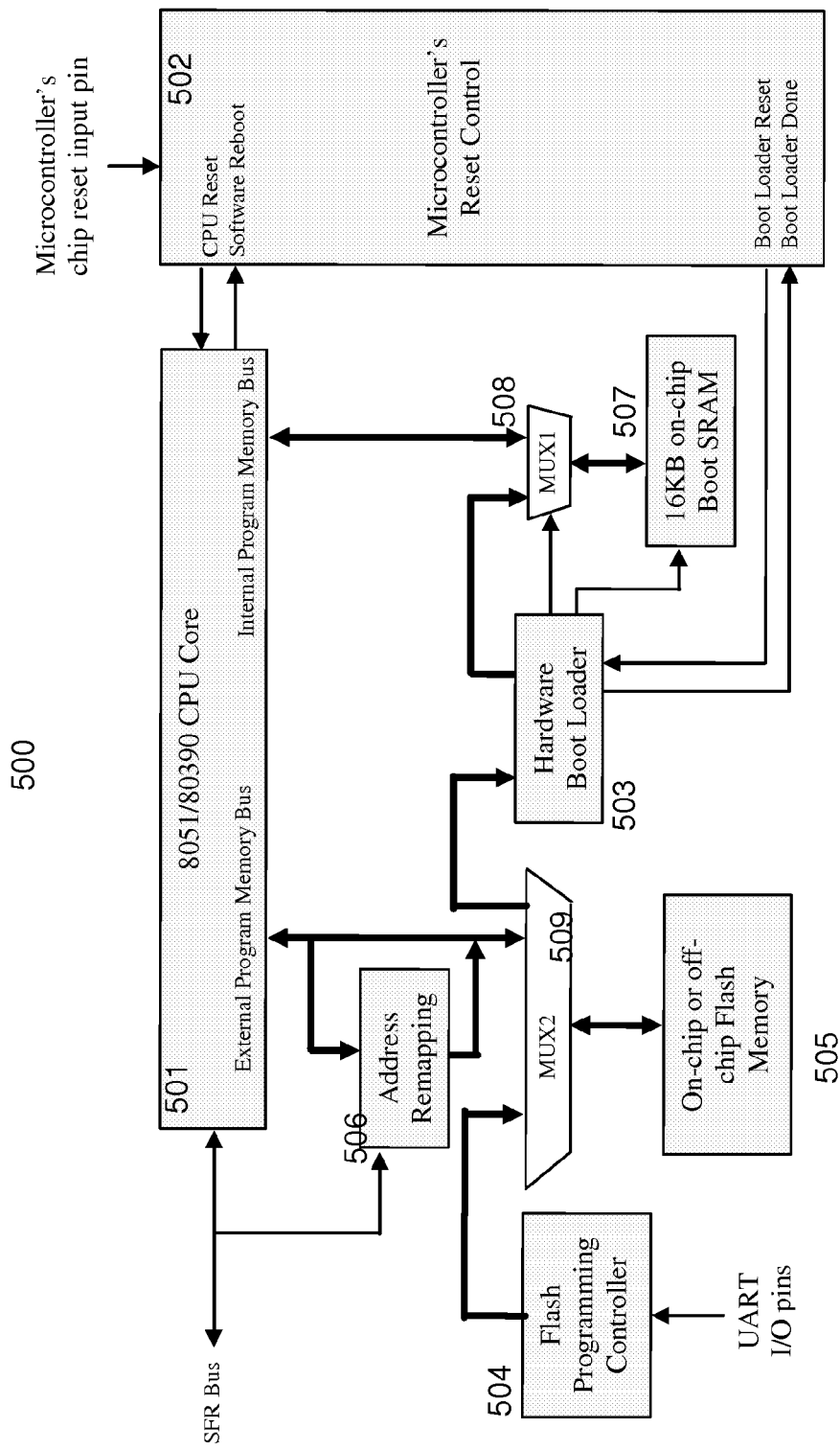
Figure 5: Embedded System Block Diagram

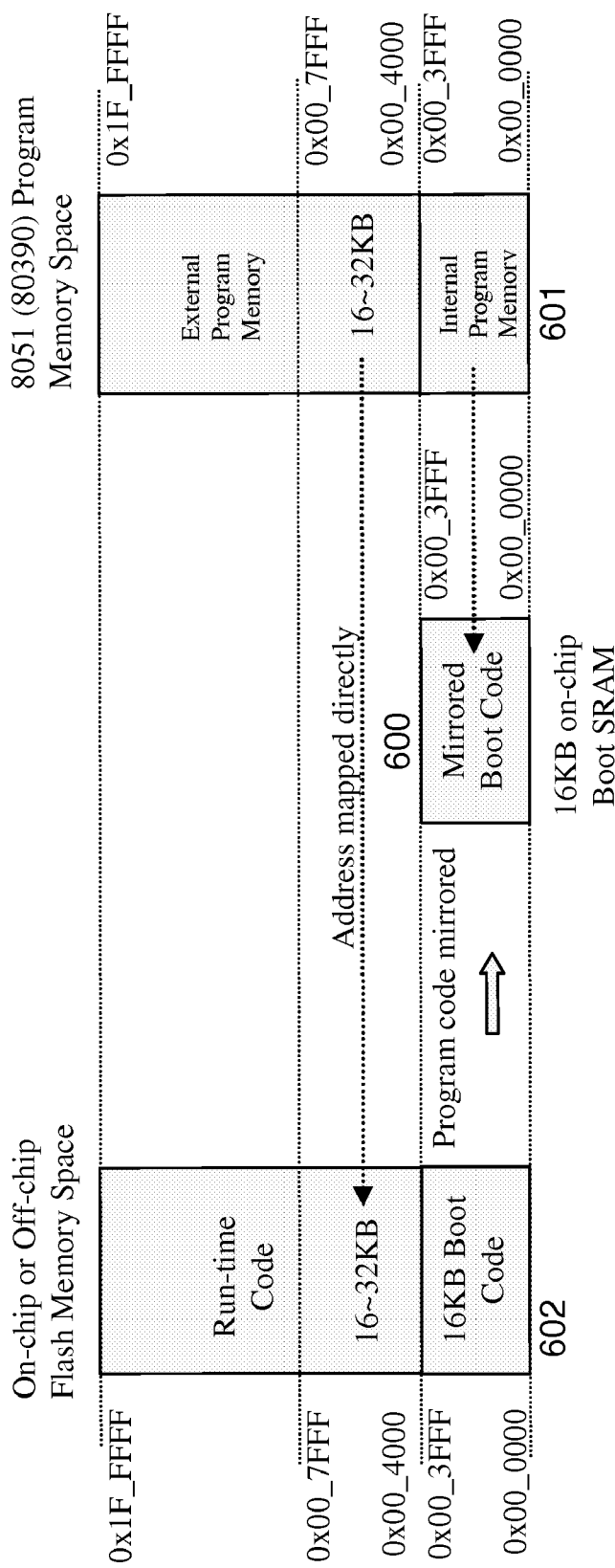
Figure 6: Embedded System Flash Address vs. Program Address Remapping Mechanism Disabled

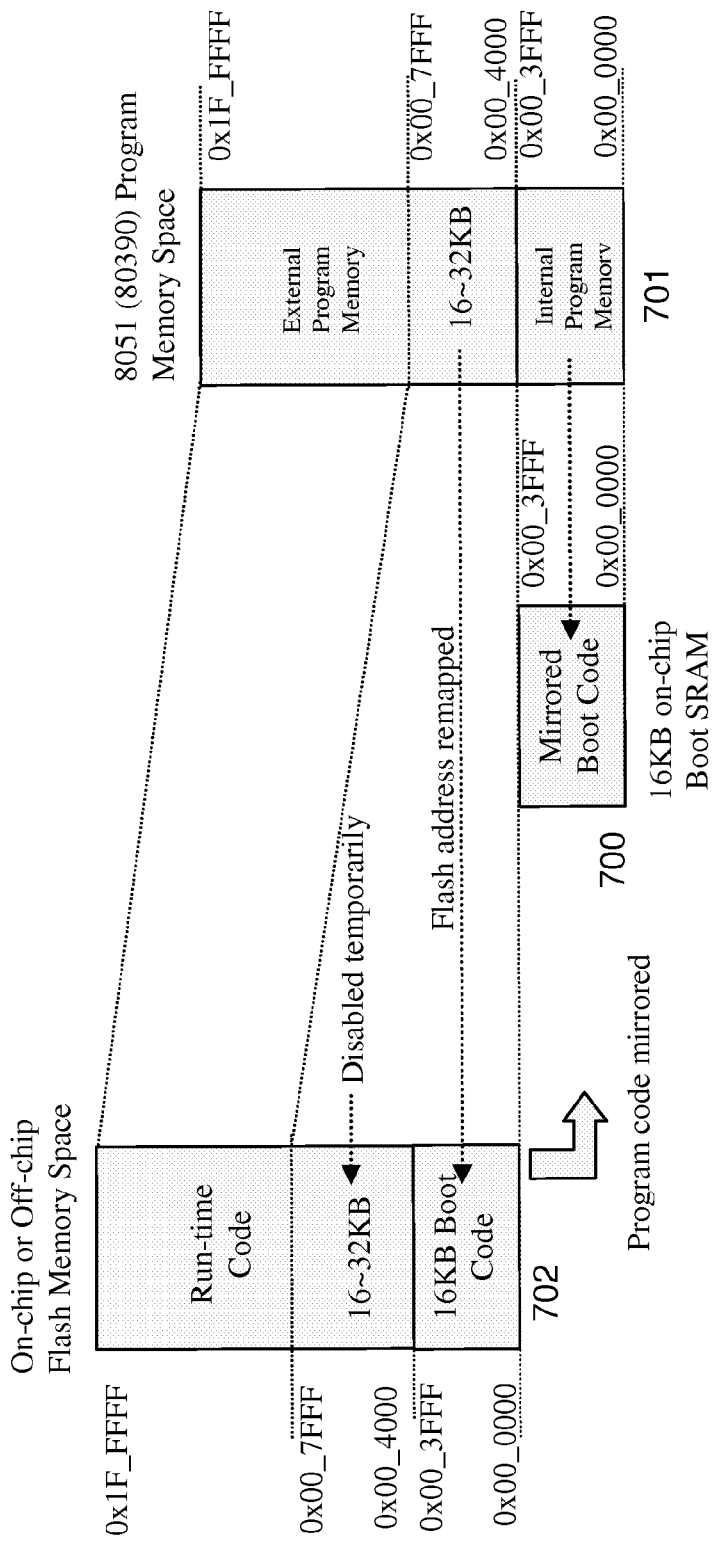
Figure 7: Embedded System Flash Address vs. Program Address Remapping Mechanism Enabled

METHOD AND SYSTEMS FOR ADVANCED REPROGRAMMABLE BOOT CODES AND IN-APPLICATION PROGRAMMING OF EMBEDDED MICROPROCESSOR SYSTEMS

FIELD OF INVENTION

The present invention relates generally to an advanced method and system, which supports for an intelligent Boot loader of an embedded systems and an efficient technique to upgrade the operation system Boot codes via network as well as In-Application programming for updating run-time applications through network or other communication links.

BACKGROUND OF THE INVENTION

The highly demanded embedded system such as 8051/80390 based 8-bit single-chip microcontroller usually features either ROM (Read-Only-Memory), Flash or EEPROM (Electrically-Erasable-Read-Only-Memory) memory as program memory to store the Boot Codes. The Boot Codes is a firmware with predefined function to perform microcontroller general initialization, power-on self-test, some application specific tasks or libraries, or tasks for application code upgrade. In contrast to Boot Codes, the application specific software program codes are usually referred as Run-time Codes.

There are two widely used basic approaches to distribute of ROM, Flash or EEPROM memory for Boot Code storage. The first approach is to completely use internal Boot ROM or a combination of internal Boot ROM and on-chip or off-chip Flash/EEPROM memory. The requirement for this approach is that the software or firmware program in Boot Codes has to be fully or partially stabled and finalized (partially stable and finalized will have that portion to be in ROM and still-in-developing-stage portion in Flash/EEPROM memory). The advantage of this approach is to utilize the high speed access to internal ROM. The disadvantage is a long development cycle and its associated cost to achieve a fully tested and verified software or firmware for the Boot codes. Furthermore, the fixed mask of internal ROM restricts the flexibility to make field upgrade for feature enhancement or bug fix.

The second approach is to use combination of on-chip or off-chip Flash/EEPROM memory without internal Boot ROM. It is not required for the approach that the software or firmware program in Boot Codes has to be fully or partially stabled and finalized. The advantage of this approach is that it is easy to customize or perform field upgrade on final application systems for feature enhancement or bug fix for the software or firmware program in Boot Code. The disadvantage is a relatively slower speed access time to memory in boot-up process. Furthermore, it usually requires at least two banks of Flash or EEPROM memory to support In Application Programming.

SUMMARY OF THE INVENTION

The present invention includes but is not limited to new inventive approaches to provide for reprogramming boot codes and run-time codes of the embedded systems.

In accordance to an aspect of the invention, the system approached is provided to support an embedded system with efficient reconfigurable boot loader comprises: after power-on reset or upon receiving a system reset signal, which starts a first phase of a system reset cycle, a specially designed Hardware Boot Loader in embedded system microcontroller will copy an operation system Boot codes from on-chip or off-chip Flash/EEPROM memory to the internal high speed Boot SRAM (as "program code mirroring") during a second phase of a system reset cycle and the processor executes at least a portion of the operation system codes from the second memory medium after the second phase of the system reset cycle. During this process, the internal Boot SRAM is in write-enable mode. After finished loading the Boot Code, the CPU will be taken out of the system reset cycle and start fetching and executing Boot Code from the internal Boot SRAM. Now the internal Boot SRAM is in read-only mode (similar to a regular Boot ROM).

The core operation system codes starts within internal Boot SRAM, and the other portion of the operation system codes may execute within the Flash/EEPROM memory. There will be no difference regarding program compiling and link, from the point of view in software, the microcontroller's program memory space is always starts from lowest address 0x00_0000 and the program space is always contiguous, except that it is partially on internal Boot SRAM (with higher execution speed) and partially on on-chip Flash memory (with moderate execution speed).

The system approach further comprises wherein the at least a portion of the operation system codes executed from the second memory medium by the processor includes a minimum set of self-sustained predefined operational tasks at least including system initiation, Interrupt Vector and Interrupt Service Routine, memory read/write, input/output handling, application codes upgrade and network interface;

wherein the system reset cycle starts a first phase of a system reset cycle after the embedded system receiving a system reset signal;

wherein the boot loader generates a reset signal to the processor during the second phase of a system reset cycle;

wherein a first phase of the system reset cycle comprises an first delayed reset signal to the boot loader in response to receiving a system reset signal; and wherein a second phase of the system reset cycle further comprises a second delayed reset signal to the processor in response to receiving a first delayed reset signal.

In accordance to another aspect of the invention, the new architecture enables software or firmware program in Boot Codes with high flexibility during development phase, it is easy to customize or perform field upgrade or bug fix after post-production or final system on the field because of the general re-programmability of Flash or EEPROM memory. This new architecture enables the In Application Programming (IAP) capability for the embedded system without stopping the CPU (off-line) or having to have dual banks of on-chip Flash memory. In addition, the only requirement is to prepare the Flash memory Sector Erase and Programming inside the Boot Codes.

The system approach is provided to support an embedded system with efficient reconfigurable in-application programming further comprises:

a multiplexing unit (MUX) coupled to the first memory medium, the processor, a boot loader and an in-system programming (ISP) controller, wherein the ISP controller is configured to reprogram the first memory medium through one or more dedicated ISP port or through a memory bus of the processor (CPU off-line), wherein the MUX is configured to switch between the ISP controller and the memory bus of the processor to select the reprogramming source for the first memory medium;

the multiplexing unit further switches within two distinct modes: an in-system programming mode and in-application programming mode;

wherein during the in-system programming mode the multiplexing unit switches the programming source to the one or more dedicated ISP ports, and the in-system programming is executed via the one or more dedicated ISP ports independent of the processor operation states; and wherein during the in-application programming mode (CPU on-line) the multiplexing unit switches the programming source to the memory bus of the processor, and the in-application programming is executed while the processor executes the at least a portion of the operation system codes with the a minimum set of self-sustained operational tasks from the second memory medium.

In accordance to another aspect of the invention, the system approaches completely frees the need to freeze the Boot Codes before microcontroller tape-out or production release or product verification or even after product sales for field upgrade purpose. This supports single bank of on-chip or off-chip first memory medium and further helps for Boot Code changes without incurring NRE cost.

The system approach is provided to support an embedded system with efficient reconfigurable boot codes, in-application programming as well as in-system programming further comprises:

a memory address remapping controller configured to remap a disabled memory address range to the address range of said first memory medium in order to rewrite a new operation system codes into said first memory medium while said processor is executing said at least a portion of said operation system codes from said second memory medium.

wherein the memory address-remapping controller further operates within two distinct modes: a normal reconfiguration mode and an address-remapping reconfiguration mode;

wherein during the normal reconfiguration mode the memory address remapping controller maps to same memory space of the first memory medium in a normal mode for rewriting run-time codes while the processor executes the at least a portion of the operation system codes from the second memory medium after a system reset cycle;

wherein during the address-remapping reconfiguration mode the memory address remapping controller maps a disabled memory address range to the address range of the first memory medium in a memory address remapping mode.

The preferred features may be combined as appropriate, as would be apparent to a skilled, person, and may be combined with any of the aspects of the invention.

Further features and advantages of the present invention, as well as the structure and operation of various embodiments of the present invention is described in detail below with reference to the accompanying drawings.

BRIEF DESCRIPTION OF THE DRAWINGS

FIG. 1 illustrates Boot Code Starting Address Space.

FIG. 2 illustrates In-ROM Boot Code Starting Address Space.

FIG. 3 illustrates a Boot Loader Memory Map of the invention.

FIG. 4 illustrates a Boot Loader reset cycle timing diagram of the invention.

FIG. 5 illustrates the Embedded System Block Diagram of the invention.

FIG. 6 illustrates the Embedded System Flash Address vs. program memory address with the Address Remapping Mechanism disabled of the invention.

FIG. 7 illustrates the Embedded System Flash Address vs. Program memory address with the Address Remapping Mechanism Enabled of the invention.

DETAIL DESCRIPTIONS OF THE INVENTION

FIG. 1 illustrates Boot Code Starting Address Space. The partial Boot Code 101 is located in program memory space starting from 0x00_0000 and implemented as on-chip ROM (so-called Boot ROM) inside microcontroller.

The Run-time Code 102 and partial Boot Code 101 are stored in a separate on-chip Flash memory above the Boot Code area.

The partial Boot Code 101 in ROM is not updateable while the partial Boot Code or Run-time Code in Flash is updateable off-line or on-line (i.e. In-Application Programming).

FIG. 2 illustrates In-ROM Boot Code Starting Address Space. The Boot Code is located in program memory space starting from 0x00_0000 and implemented as on-chip ROM 200 (so-called Boot ROM) inside microcontroller.

The Run-time Code 201 and New Boot Code 202 are stored in off-chip Flash, EEPROM or SRAM memory to totally replace the Boot Code in on-chip ROM.

The Boot Code or Run-time Code is updateable off-line or on-line (i.e. In-Application Programming). However, the New Boot Code on off-chip memory will be running at slower speed FIG. 3 illustrates a Boot Loader Memory Map of the invention. Typically, the Internal Program Memory occupies program memory space between 0 KB to anywhere within 64 KB while the External Program Memory space starts contiguously from where Internal Program Memory ends to the maximum addressable program memory space supported by any given CPU core.

After CPU Core leaves reset state, it boots up by starting execution of software or firmware program code at location 0x00_0000.

The Internal Program Memory is usually used to store "Boot Codes" and implemented as ROM 302 with zero or fewer wait state in access time. The software or firmware program in Boot Codes usually supports at least system initialization, UART, Ethernet and network TFTP protocol and Flash memory sector erase and byte program functions. These functions allow it to receive the new firmware (in packets) from external source such as another host or network server for its application software or firmware update. The Boot ROM size should be properly selected to include such functions.

The External Program Memory is usually used to store program codes referred as "Run-time Codes" and implemented as Flash/EEPROM memory 303 with some more relaxed wait states in access time depending on the associated applications.

For the Internal Program Memory with "Boot Codes" ROM, the extra burden is that the "Boot Codes" has to be fully or partially stabled and finalized in the system development. It would be very desirable in an embedded system to overcome this burden and to have the capacity to receive the new "Boot Codes" (in packets) from external source such as another host or network server for "Boot Codes" update without taking the system off-line.

Furthermore, the "Boot Codes" usually starts in program memory space between 0 KB to anywhere within 64 KB in an embedded system. Thus, there is potentially a conflict in program memory addressing to update the "Boot Codes" in Flash memory while the "Boot Codes" is actually running in the same address range.

FIG. 4 illustrates a Boot Loader system reset cycle timing diagram of the invention. In accordance to an embodiment of the invention, there are three operation states for Microcontroller embedded system as:
1. "Reset": During microcontroller power-on reset or software reboot, the entire microcontroller embedded system first enters into reset as the first phase (Hardware Boot Loader).
2. "Copying Boot Code": Hardware Boot Loader starts to copy Boot Code from on-chip or off-chip Flash memory on External Program Memory space to internal Boot SRAM 302 on Internal Program Memory space, until filling up complete internal Boot SRAM 302. During this time, the CPU is still being held in reset state.
3. "Normal operation": Hardware Boot Loader has completed, and then microcontroller will be initialized and starts normal operation.

Note that there are three "reset" signals, one reset is the Boot Loader Reset and the other is the CPU Reset and the main one is the microcontroller whole chip system reset.

FIG. 5 illustrates the Embedded System Block Diagram of the invention.

The Internal Program Memory is implemented as 16 KB SRAM 507 (called "16 KB On-chip Boot SRAM" in above 2 figures). This Boot SRAM 507 is write-enable mode during microcontroller power-on reset or software reboot, while it is read-only mode during microcontroller normal operation.

Initially, the 16 KB Boot Code is stored in on-chip or off-chip Flash memory 505 at location 0x00_0000~0x00_3FFF, pre-programmed by the user through the Flash Programming Controller 504 and UART interface during project development or production phase. This is so-called In-System-Programming (ISP). The on-chip or off-chip Flash memory is partitioned into several sectors with first sector (lowest sector with starting address of 0x00_0000) having the same size of the Boot SRAM 507. During microcontroller power-on reset or software reboot (Boot Loader Reset de-asserted and CPU Reset asserted), the Boot Code is copied to the Boot SRAM 507 by the "Hardware Boot Loader" 503. This is so called "program code mirroring".

The Hardware Boot Loader 503 is a new circuit that only functions to copy the Boot Code from on-chip or off-chip Flash memory 505 on External Program Memory space to the Boot SRAM 507 on Internal Program Memory space. It is achieved through sequentially reading one byte from on-chip or off-chip Flash memory 505 at one address location and then writing the same read data byte to Boot SRAM 507 at the same address location.

The microcontroller 501 starts normal operation (both Boot Loader Reset and CPU Reset de-asserted) only after Hardware Boot Loader 503 finishes copying the required 16 KBytes of Boot Code. At that point, the Hardware Boot Loader 503 sends a completion indication signal (called "Boot Loader Done" in above figure) to microcontroller's Reset Control so that it can release "CPU Reset" signal to have microcontroller's CPU and other functions start execution. At the same time, it will set the Boot SRAM 507 to read-only mode making it like a typical ROM.

The microcontroller 501 starts execution of program code (Boot Code) at memory location 0x00_0000 residing in 16 KB on-chip Boot SRAM 507 with zero wait-state like accessing a typical ROM.

In accordance to another embodiment of the invention, if user needs to preprogram or update the Run-time Code on on-chip or off-chip Flash memory 505, it can do so by having CPU Core fetch and execute from the Boot SRAM 507 to perform sector erasing or byte programming on Flash memory. The software or firmware program in Boot Code being mirrored onto Boot SRAM 507 usually should support Flash memory sector erase and byte program commands, basic UART or Ethernet and network TFTP protocol functions to be able to receive the new Run-time Code firmware (in packets) from external source such as another host or network server and write it to on-chip or off-chip Flash memory 505. This method allows entire Run-time Code located at 0x00_4000 and above on External Program Memory space to be preprogrammed or updated in application while CPU is on-line. This is so-called In-Application-Programming (IAP).

In accordance to another embodiment of the invention, in order to update the original 16 KB Boot Code stored in on-chip or off-chip Flash memory 505 at location 0x00_0000_~0x00_3FFF, an address remapping mechanism is required as the 0x00_0000_~0x00_3FFF is being defined as Internal Program Memory space where CPU Core 501 access to these program memory space will always be directed to the 16 KB on-chip Boot SRAM. The "Address Remapping" circuit, upon enabled by CPU Core through configuring a SFR register, it will remap some External Program Memory address space at 0x00_4000~0x00_7FFF (usually mapped directly to the same address space of on-chip or off-chip Flash memory) to Flash memory's physical address space at 0x00_0000_~0x00_3FFF.

In other words, CPU Core 501 access to External Program Memory space 0x00_4000~0x00_7FFF will be redirected to on-chip or off-chip Flash memory 505 physical address space at 0x00_0000~0x00_3FFF. So now, the original Boot Code on on-chip or off-chip Flash memory can be sector-erased and reprogrammed with new version by having CPU Core running those IAP functions from Boot SRAM. This is achieved through writing new Boot Code to External Program Memory space between 0x00_4000~0x00_7FFF.

After updating the new Boot Code onto Flash memory at 0x00_0000~0x00_3FFF, the CPU Core 505 then executes a software reboot by configuring a SFR register. This will allow the new Boot Code to be re-mirrored to the Boot SRAM and take effect from now on.

FIG. 6 presents the situation when Address Remapping is disabled. CPU Core's Internal Program Memory space is always mapped to the 16 KB on-chip Boot SRAM 600 with the same address space and it is always read-only mode during normal operation. CPU Core's fetching and executing from these address space will not be affected by Flash memory sector erasing and programming activities on External Program Memory space 602.

CPU core's External Program Memory space at 0x00_4000~0x1F_FFFF is mapped directly to on-chip or off-chip Flash memory with the same address space. Firmware executing Flash memory sector erasing or byte programming will cause the Flash memory to temporarily stop responding to the bus cycles of these address space if CPU Core's tries to access the Flash memory again. Therefore, the program code for Flash memory sector erasing or byte programming operations should reside in Boot SRAM 600.

FIG. 7 illustrates the Embedded System Flash Address vs. Program memory address with the Address Remapping Mechanism Enabled of the invention.

When Address Remapping is enabled:

CPU Core's Internal Program Memory space is always mapped to the 16 KB on-chip Boot SRAM 700 with the same address space and it is always read-only mode during normal operation. CPU Core's fetching and executing from these address space will not be affected by Flash memory sector 702 erasing and programming activities on External Program Memory space.

CPU core's External Program Memory space at 0x00_4000~0x_7FFF is temporarily remapped to on-chip or off-chip Flash memory address space at 0x00_0000~0x00_3FFF where the original Boot Code is located. The Flash memory address space at 0x00_4000~0x_7FFF is temporarily not accessible.

To update the original Boot Code on on-chip or off-chip Flash memory 702, after Address Remapping is enabled, CPU Core simply writes to 0x00_4000~0x_7FFF program memory space. Note that firmware executing Flash memory sector erasing or byte programming will cause the Flash memory to temporarily stop responding to the bus cycles of these address space if CPU Core's tries to access the Flash memory again. Therefore, the program code for Flash memory sector erasing or byte programming operations should reside in Boot SRAM 700.

For more clarity, there are three cases describing in details the proper software programming procedures to perform the read and write access to on-chip or off-chip Flash memory of the invention.

Case 1: To write 16 KB above address space (at 0x00_4000~0x1F_FFFF) of Flash memory 702:

Step 1: Software first writes PWE bit=1 in PCON SFR register, to enable program write in CPU.

Step 2: Software writes FARM bit=1 in CSREPR SFR register, to enable Flash memory address re-mapping mechanism.

Step 3: Programming sequence for enabling "Byte Program" command for on-Flash memory:
1. Write (0x4000+0x555)=0xAA
2. Write (0x4000+0x2AA)=0x55
3. Write (0x4000+0x555)=0xA0

Step 4: Software writes FARM bit=0, to disable Flash memory address re-mapping mechanism.

Step 5: Now perform the actual byte write command.
1. Write PA=PD (where PA: any 16 KB above Flash memory address to be programmed, PD: write data)
2. Repeatedly read PA. If equal to PD, then the Program command is completed.

Step 6: Software writes PWE bit=0, to disable program write in CPU.

Case 2: To read the lower 16 KB (at 0x00_0000~0x00_3FFF) of Flash memory 702:

Step 1: Software first writes FARM bit=1 in CSREPR SFR register, to enable Flash memory address re-mapping mechanism.

Step 2: Reading any program address space 16K~32K (0x00_4000~0x007FFF) will be remapped to the 0K~16K (0x00_0000~0x00_3FFF) address space of the Flash memory. Therefore, the memory content of lower 16 KB of the on-chip Flash memory can now be accessed. Note that the access of the 16 KB~32 KB address space of Flash memory is temporarily disabled after step 1.

Step 3: After done with accessing the lower 16 KB of on-chip Flash memory, the software then writes FARM bit=0, to disable Flash memory address re-mapping mechanism. Now the access of program address space 16 KB~32 KB would revert back to the same address space of the Flash memory as usual, and the access of 0K~16K (0x00_0000~0x00_3FFF) address space of the Flash memory is disabled again.

Case 3: To write the lower 16 KB (at 0x00_0000~0x00_3FFF) of Flash memory 702:

Step 1: Software first writes PWE bit=1 in PCON SFR register, to enable program write in CPU.

Step 2: Software writes FARM bit=1 in CSREPR SFR register, to enable Flash memory address re-mapping mechanism. Now access of the 0K~16K (0x00_0000~0x00_3FFF) address space of the Flash memory would come from software accessing the program address space 16K~32K (0x00_40000x007FFF).

Step 3: Programming sequence for performing Flash memory "Sector Erase" command:
1. Write (0x4000+0x555)=0xAA
2. Write (0x4000+0x2AA)=0x55
3. Write (0x4000+0x555)=0x80
4. Write (0x4000+0x555)=0xAA
5. Write (0x4000+0x2AA)=0x55
6. Write (0x4000+0x000)=0x30
7. Repeatedly read (0x4000+0x3FFF). If equal to 0xFF, the Sector Erase command is completed.

Step 4: Programming sequence for performing Flash memory "Byte Program" command:
1. Write (0x4000+0x555)=0xAA
2. Write (0x4000+0x2AA)=0x55
3. Write (0x4000+0x555)=0xA0
4. Write (0x4000+PA)=PD (where PA: any 0~16 KB of on-chip Flash memory address to be programmed, PD: write data)
5. Repeatedly read (0x4000+PA). If equal to PD, then the "Byte Program" command is completed.

Step 5: Software writes FARM bit=0, to disable Flash memory address re-mapping.

Step 6: Software writes PWE bit=0, to disable program write in CPU.

Although illustrative embodiments have been described herein with reference to the accompanying drawings is exemplary of a preferred reprogrammable boot loader system and method which may be implemented in the present invention, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

Terminology and Lexicography:

Boot loader: logic module to handle the boot up process for an embedded system, such as microcontroller or DSP system. Usually copies a portion of boot codes from low cost slower ROM or FLASH memory during the reset cycle to the processor program addressed memory and initiate the processor to execute a portion of the boot code for minimal operation system codes.

In-application programming: The software or firmware program in Boot Code usually supports Flash memory sector erase and byte program commands, basic UART or Ethernet and network TFTP protocol functions to be able to receive the new Run-time Code firmware (in packets) from external source such as another host or network server and write it to on-chip or off-chip Flash memory. This method allows entire Run-time Code located at and above on External Program Memory space to be preprogrammed or updated in application while CPU is on-line.

In-system programming: Boot Code is stored in on-chip or off-chip Flash memory, pre-programmed by the user through the Flash Programming Controller and UART interface during project development or production phase.

The invention claimed is:

1. An embedded system with efficient reconfigurable boot loader, comprising:
   a processor;
   a first memory medium coupled to said processor;
   a second memory medium coupled to said processor;
   a boot loader coupled to said first memory medium, said second memory medium and said processor, wherein said boot loader is configured to copy an operation system codes from said first memory medium to said second memory medium during a second phase of a system reset cycle and said processor executes at least a portion of said operation system codes from said second memory medium after said second phase of said system reset cycle,
   wherein said system reset cycle starts a first phase of a system reset cycle after said embedded system receiving a system reset signal,
   wherein said boot loader generates a delayed reset signal to said processor during said second phase of a system reset cycle,
   wherein said first memory medium comprise non-volatile memory and said second memory medium comprises high speed internal Boot SRAM for Boot codes execution starting from lowest address of corresponding program memory space;
   said operation system codes is stored in a memory space starting from lowest address of said first memory medium;
   said copy an operation system codes further comprises copying to a corresponding program memory space starting from lowest address of said second memory medium during;
   said second phase of said system reset cycle and said processor to execute at least a portion of said operation system codes from said corresponding memory space starting from lowest address of said second memory medium after said second phase of said system reset cycle; and
   said at least a portion of said operation system codes executed from said second memory medium by said processor includes a minimum set of self-sustained predefined operational tasks comprising at least one of system initiation, memory read/write access, input/output handling, application codes upgrading and network interface protocols.

2. The embedded system in accordance with claim 1, further comprises a multiplexing unit (MUX) coupled to said first memory medium, said processor and an in-system programming (ISP) controller, wherein said ISP controller is configured to reprogram said first memory medium through one or more dedicated ISP port or through a memory bus of said processor, wherein said MUX is configured to switch between the said ISP controller and said memory bus of said processor to select source to reprogram said first memory medium; and a memory address remapping controller configured to remap a disabled memory address range to address range of said first memory medium in order to rewrite a new operation system codes into said first memory medium while said processor is executing said at least a portion of said operation system codes from said second memory medium.

3. The embedded system in accordance with claim 1, wherein said first phase of said system reset cycle comprises generating a first delayed reset signal to said boot loader in response to receiving said system reset signal.

4. The embedded system in accordance with claim 1, wherein a second phase of said reset cycle further comprises generating a second delayed reset signal to said processor in response to receiving said first delayed reset signal.

5. The embedded system in accordance with claim 1, wherein during said copying an operation system codes process, said internal Boot SRAM is in write-enable mode.

6. An embedded system with efficient reconfigurable in application programming comprising:
   a processor;
   a first memory medium coupled to said processor;
   a second memory medium coupled to said processor; and
   a boot loader coupled to said first memory medium, said second memory medium and said processor; said boot loader is configured to copy an operation system codes from said first memory medium to said second memory medium during a system reset cycle and said processor executes at least a portion of said operation system codes from said second memory medium after said system reset cycle,
   wherein said boot loader is configured to copy run-time application codes from a memory space starting from a higher address range of said first memory medium to a corresponding memory space starting from a higher address range of said second memory medium according to configuration within said at least a portion of said operation system codes, and said processor executes said run-time application codes from corresponding memory space starting from a higher address range of said second memory medium after completion of copying said run-time application codes from said higher address range of said first memory medium to said higher address range of said second memory medium;
   a multiplexing unit (MUX) coupled to said first memory medium, said processor and an in-system programming (ISP) controller, wherein said ISP controller is configured to reprogram said first memory medium through one or more dedicated ISP port or through a memory bus of said processor, wherein said MUX is configured to switch between the said ISP controller and said memory bus of said processor to select source to reprogram said first memory medium,
   wherein said first memory medium comprise non-volatile memory and said second memory medium comprises high speed internal Boot SRAM for Boot codes execution starting from lowest address of corresponding program memory space.

7. The embedded system in accordance with claim 6, wherein the first memory medium comprises non-volatile memory to store said operation system codes and a run-time application codes.

8. The embedded system in accordance with claim 6, wherein said at least a portion of said operation system codes executed from said second memory medium by said processor includes a minimum set of self-sustained predefined operational tasks comprising at least one of system initiation, memory read/write access, input/output handling, application codes upgrading and network interface protocols.

9. The embedded system in accordance with claim 8, said multiplexing unit further switches within two distinct modes: an in-system programming mode and in-application programming mode.

10. The embedded system in accordance with claim 9, wherein during said in-system programming mode said multiplexing unit switches the programming source to said one or more dedicated ISP ports, and said in-system programming is executed via said one or more dedicated ISP ports independent of said processor operation modes.

11. The embedded system in accordance with claim 9, wherein during said in-application programming mode said multiplexing unit switches the programming source to said memory bus of said processor, and said in-application programming is executed while said processor executes said at least a portion of said operation system codes with said a minimum set of self-sustained operational tasks from said second memory medium.

12. The embedded system in accordance with claim 6, further comprises a memory address remapping controller configured to remap a disabled memory address range to address range of said first memory medium in order to rewrite a new operation system codes into said first memory medium while said processor is executing said at least a portion of said operation system codes from said second memory medium,
  wherein said system reset cycle starts a first phase of a system reset cycle after said embedded system receiving a system reset signal.

13. An embedded system for efficient reconfigurable boot loader, comprising:
  a processor;
  a first memory medium coupled to said processor;
  a second memory medium coupled to said processor;
  a boot loader configured to copy an operation system codes from said first memory medium to said second memory medium during a system reset cycle and said processor executes at least a portion of said operation system codes by said processor from said second memory medium after a system reset cycle;
  a memory address remapping controller configured to remap a disabled memory address range to address range of said first memory medium in order to rewrite a new operation system codes into said first memory medium while said processor is executing said at least a portion of said operation system codes from said second memory medium;
  said first memory medium comprise non-volatile memory and said second memory medium comprises high speed internal Boot SRAM for Boot codes execution starting from lowest address of corresponding program memory space; and said at least a portion of said operation system codes executed from said second memory medium by said processor includes a minimum set of self-sustained predefined operational tasks comprising at least one of system initiation, memory read/write access, input/output handling, application codes upgrading and network interface protocols.

14. The embedded system in accordance with 13, wherein said memory address remapping controller further operates within two distinct modes: a normal reconfiguration mode and an address-remapping reconfiguration mode.

15. The embedded system in accordance with claim 14, wherein during said normal reconfiguration mode said memory address remapping controller maps to same memory space of said first memory medium in a normal mode for rewriting run-time codes while said processor executes said at least a portion of said operation system codes from said second memory medium after a system reset cycle.

16. The embedded system in accordance with claim 14, wherein during said address-remapping reconfiguration mode said memory address remapping controller maps a disabled memory address range to the address range of said first memory medium in a memory address remapping mode for rewriting operation system boot codes while said processor executes said at least a portion of said operation system codes from said second memory medium after a system reset cycle.

17. The embedded system in accordance with claim 13, further comprises a multiplexing unit (MUX) coupled to said first memory medium, said processor and an in-system programming (ISP) controller, wherein said ISP controller is configured to reprogram said first memory medium through one or more dedicated ISP port or through a memory bus of said processor, wherein said MUX is configured to switch between the said ISP controller and said memory bus of said processor to select source to reprogram said first memory medium,
  wherein said system reset cycle starts a first phase of a system reset cycle after said embedded system receiving a system reset signal.

* * * * *